April 5, 1960 H. BRUDNEY 2,931,096
MECHANISM FOR INSERTING DOLL EYES IN FLEXIBLE DOLL HEADS
Filed Sept. 13, 1957 2 Sheets-Sheet 1
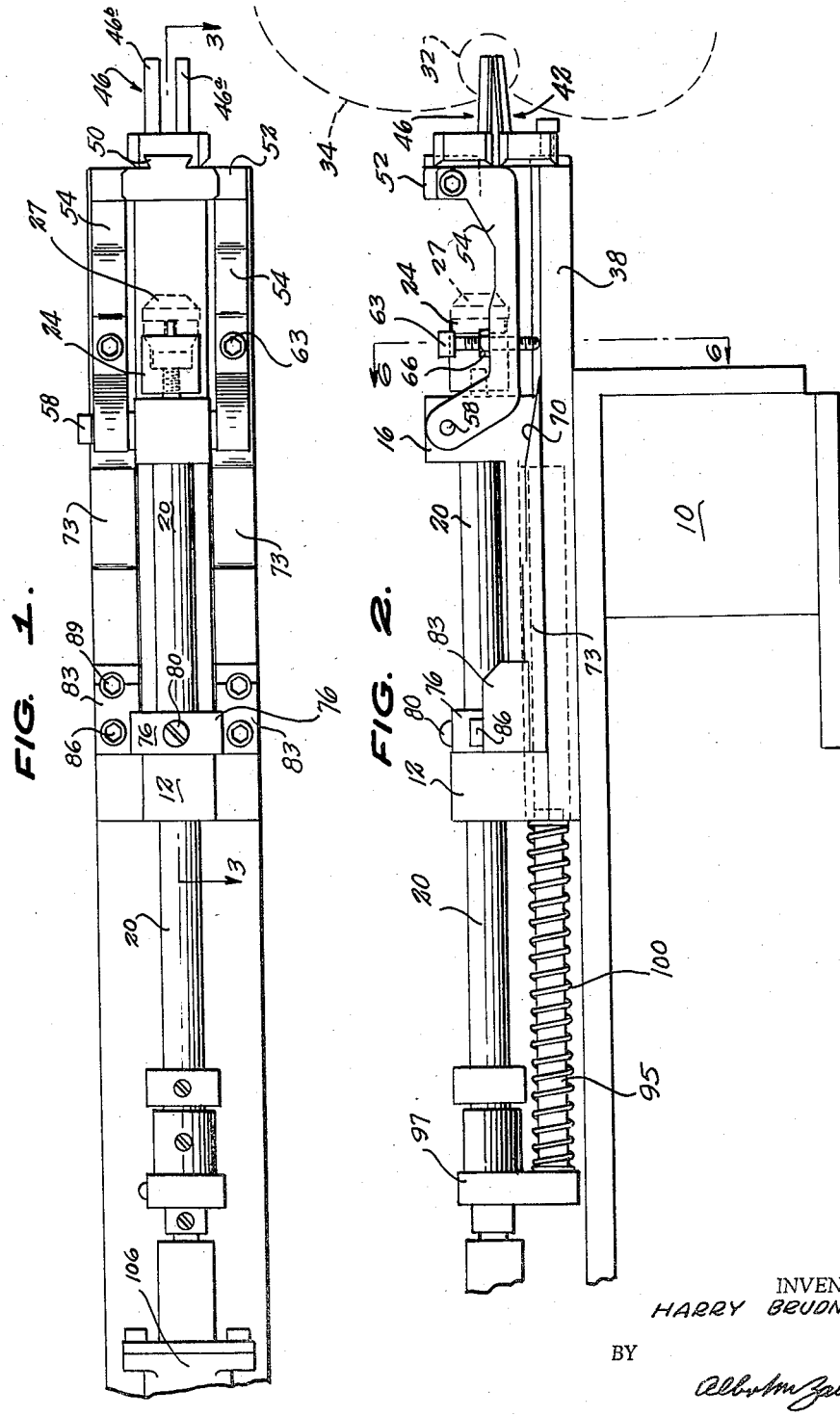
INVENTOR.
HARRY BRUDNEY,
BY
Albert M Zalkind
ATTORNEY.

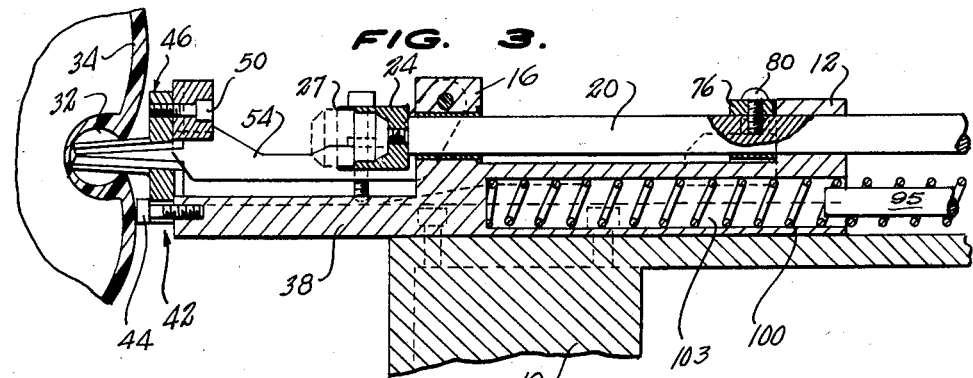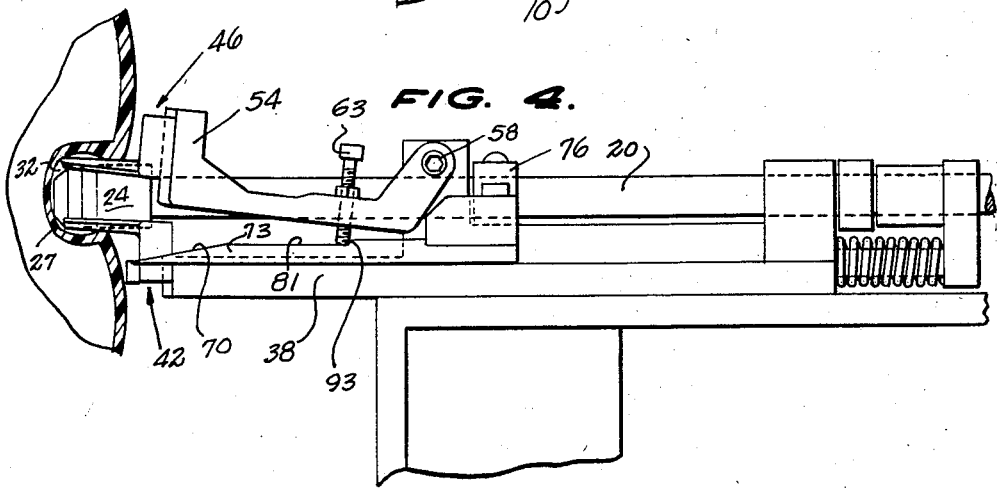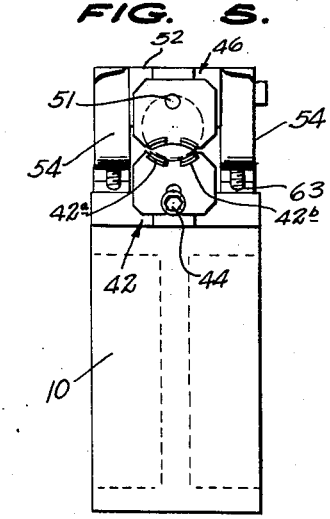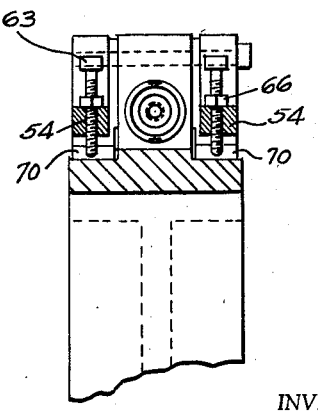

United States Patent Office 2,931,096
Patented Apr. 5, 1960

2,931,096

MECHANISM FOR INSERTING DOLL EYES IN FLEXIBLE DOLL HEADS

Harry Brudney, New York, N.Y.

Application September 13, 1957, Serial No. 683,794

6 Claims. (Cl. 29—209)

This invention relates to doll eye inserting machines and, more particularly, to a machine for use in conjunction with so-called soft doll heads.

It is an object of the invention to provide a machine for inserting an eye of the movable sleeping type into a flexible eye cavity without placing any stress on the eye structure in forcing open the cavity to receive the eye structure.

It is another object of the invention to provide a machine which is rugged, compact, easily manufactured, and will stand up for long periods of use.

It is a further object of the invention to provide a machine which may be readily adapted for either manual or power operation.

Briefly, my invention contemplates the use of a plunger having a device fashioned to hold a doll eye, in conjunction with certain finger elements disposed outwardly of the plunger in the direction of travel thereof, which finger elements are adapted to be inserted in the opening of a flexible eye socket and arranged for motion with respect to each other to temporarily expand the socket opening as the plunger moves the eye thereinto between the spacing which separates the finger elements as they spread the eye socket opening. Thus, the eye is moved into the initially widened socket. The particularly novel feature of the invention is the provision of simple means for effecting the relative motion of the fingers upon movement of the plunger without, however, placing any of the stress required to widen the eye opening on the eye structure. This is in contrast to prior art devices wherein the forces required to spread the opening of the eye cavity were transmitted to the doll eye itself with sometimes damaging results.

A detailed description of the invention now follows taken in conjunction with the appended drawing, in which:

Figure 1 is a plan view of a machine;

Figure 2 is an elevation thereof;

Figure 3 is a section through 3—3 of Figure 1, showing the relative initial position of the machine components in readiness to expand the eye socket opening;

Figure 4 is an elevation showing the position of the components of the machine at the moment of insertion of an eye in a flexible head, the eye socket opening being in expanded condition;

Figure 5 is an end view elevation of the machine; and

Figure 6 is a section through 6—6 of Figure 2.

Referring to the drawing, the construction utilizes a fixed pedestal base 10 having a pair of integral upright blocks 12 and 16 rearwardly and forwardly, respectively, of the base which blocks are bored to slidably receive a plunger 20 which carries at its outer extremity an adapter 24 for holding a doll eye 27.

It will be understood that the rear portion of the casing of the eye faces outwardly of the adapter 24 in position to be moved into an eye socket or cavity 32, as indicated in the flexible doll head 34, shown in dotted lines in Figure 2, and in section in Figures 3 and 4. The adapter is removably carried at the end of plunger 20 so that various sizes of eyes may be handled by the machine by substituting the corresponding sizes of adapters.

Base 10 extends forwardly in the form of a bed 38 having an outer end to which a fixed finger element 42 is secured as by a bolt 44. The finger element comprises prongs 42a and 42b which are spaced from each other and extend forwardly for insertion in the eye cavity. A coacting finger element 46 likewise consists of a pair of spaced prongs 46a and 46b, the latter element being adjustably secured as by a guideway 50 and setscrew 51 arrangement to a bridge piece 52 secured to parallel arms 54 pivotally connected at 58 to the upright guide block 16. It will thus be apparent that while finger element 42 remains stationary, being secured to base 10 through bed 38, finger element 46 carried by arms 54 can swing arcuately around pivot 58 to effect stretching of the eye cavity opening as will be noted by comparing Figures 3 and 4, wherein it will be also seen that eye 27 can be carried by plunger 20 through the space effected between the finger elements when finger element 46 swings arcuately clockwise with respect to finger element 46.

In order to provide the swinging motion of finger element 46, the arms 54 carry respective cam followers such as adjustable bolt elements 63 threadedly secured in the respective arms and adjustably secured by means of respective jam nuts 66. The lower extremities of the bolts (Figure 3) are essentially cam followers and coact with respective sloped surfaces 70 of a pair of parallel cam members 73 rigidly secured to a bridging element 76 fastened to plunger 20 in any suitable manner as by a setscrew or through bolt 80. The cam members have respective horizontal dwell surfaces 81. The bridging member 76 has integral connector blocks 83 by means of which it is bolted to the respective cams 73, as by protruding and recessed bolts 86 and 89, respectively, Figures 1 and 2.

Thus, it will be apparent that as plunger 20 moves to the right, as viewed on Figure 2 (or to the left, as viewed on Figure 3), the bridging member 76, together with the cam elements 73 will move along therewith integrally. Accordingly, sliding on the bed 38, the cam surfaces 70 will engage the tips of the respective bolts 63 and transmit a force thereto causing finger element 46 to swing into the position shown in Figure 4 and to dwell there as motion of the plunger continues, until the eye moves into the cavity, the cavity being held fully opened to receive the eye which moves through the gap or space between the finger elements 42 and 46. Motion of the plunger is stopped when the bolt ends strike respective ledges 93 formed in the cam elements, as shown in Figure 4.

It will thus be apparent from the foregoing description that the cam members perform all the work of stretching the socket opening and that no force whatsoever is transmitted to the eye structure for effecting opening.

From the initial position of Figure 3 to the final position of Figure 4, the only force on the eye is the frictional force exerted by the edges of the flexible eye cavity and the prongs of the finger elements as the finger elements are withdrawn from the cavity to leave the eye structure in position therein. Such forces are, of course, quite minor, and taken easily by the casing of the eye.

In order to provide for retraction of plunger 20, any suitable resilient means may be provided. For example, a rod 95 may be secured to the plunger 20 as by a connecting block 97, a spring 100 being disposed concentric to rod 95 and a portion of the bed 38 being provided with a bore 103 which houses part of the spring and accommodates the rod 95 as the plunger moves into eye-inserting position.

Plunger 20 may be motivated either manually or by power means, as for example, a pneumatic cylinder 106 fragmentarily shown on Figure 1.

Having thus described my invention, I am aware that changes may be made without departing from the spirit thereof and, accordingly, I do not seek to be limited to the precise illustration herein given except as set forth in the appended claims.

I claim:

1. In a machine of the class described, a plunger, means for holding an eye structure at an end of said plunger, support means comprising a base for supporting said plunger for movement toward an eye cavity, a pair of elements disposed in the path of movement of said plunger and insertable in said eye cavity, said elements being mounted for relative movement with respect to each other to widen said cavity for reception of said eye structure, and means carried by the plunger engageable with means carried by one of said elements for effecting relative motion between said elements to widen said eye cavity when said plunger is moved in a direction for insertion of an eye structure, the spacing between said elements when moved to cavity stretching position being sufficient to permit said eye structure to pass without appreciable resistance initially between said elements and into said eye cavity, and power means for effecting a reciprocal movement of said plunger to effect actuation of said one element.

2. In a device of the class described a plunger, support means comprising a base, said plunger being carried by said base for movement toward an eye cavity, means carried by an end of said plunger for holding an eye structure to be inserted in said cavity, a pair of finger means disposed forwardly of said plunger end and adapted to be inserted in said eye cavity and being disposed for movement away from each other to spread said cavity; means for moving one of said finger means away from the other finger means comprising a lever element carrying said one finger means, said lever element being mounted for pivotal motion, and cam means intermediate said plunger and said lever element and operative upon movement of said plunger to swing said lever element and said one finger means to effect a spacing between said one finger means and said other finger means through which said eye structure may pass into said eye cavity.

3. In a device of the class described, a base, a plunger slidably supported on said base, means carried by an end of said plunger for holding an eye structure, a finger element carried by said base and fixed thereto, a coacting finger element carried by said base and pivotally supported thereon, said finger elements being adapted to be inserted into an eye opening whereby pivotal motion of said pivotally carried finger element effects a spacing between said finger elements for spreading the opening and for permitting access intermediate the spaced finger elements for travel of the eye structure therebetween into said cavity, and cam means for effecting swinging of said pivotally mounted finger element comprising a cam element secured to said plunger and a follower element connected to said pivotally mounted finger element whereby movement of said plunger toward said eye opening forces said finger elements to separate by effecting pivoting of said pivotally mounted finger element.

4. In a device of the class described, a base, a plunger element mounted for reciprocal motion thereon, an adapter element carried at an end of said plunger element for holding a doll eye to be inserted in an eye opening, finger means fixed to said base and coacting finger means movable with respect thereto, wherein said pair of finger means are adapted to be inserted into said opening, a pair of spaced parallel arms for carrying said movable finger means, said arms being pivotally secured to said base and disposed at respective sides of said plunger, a pair of cam elements connected to said plunger and disposed for actuation in unison of respective arms to effect swinging thereof whereby said eye opening is stretched by said finger elements upon movement of said plunger, the spacing effected between said finger elements being sufficient to accommodate said doll eye to permit movement thereof into said opening.

5. In a device as set forth in claim 4, each of said arms carrying a cam follower for engagement with a respective cam element, said cam followers being adjustably positionable so as to be engaged by said respective cam elements at predetermined respective points, said cam elements having limit stop ledges for engaging said respective followers to limit forward motion of said plunger.

6. In a device as set forth in claim 4, said cam elements comprising elongated members having free ends formed with sloped surfaces, said arms having followers engageable with respective sloped surfaces for effecting separation of said finger elements, said cam elements having dwell surfaces to maintain a predetermined spacing of said finger elements subsequent to actuation thereof by said sloped surfaces, said cam elements being disposed with respect to the initial position of said adapter element as to fully open said eye opening as said adapter moves in the direction thereof and to maintain said fully opened condition for the portion of movement of said adapter when thrusting an eye into said opening.

References Cited in the file of this patent

UNITED STATES PATENTS

| | | |
|---|---|---|
| 1,601,549 | Wurtenberg | Sept. 28, 1926 |
| 1,621,073 | Konoff | Mar. 15, 1927 |
| 1,669,053 | Hamel | May 8, 1928 |
| 1,849,352 | Konoff | Mar. 15, 1932 |
| 1,943,736 | Marcus | Jan. 16, 1934 |